United States Patent
Norrman et al.

(10) Patent No.: US 9,775,040 B2
(45) Date of Patent: Sep. 26, 2017

(54) METHODS, NODES AND DEVICES FOR ENSURING SECURITY OF SERVICE REQUESTS

(71) Applicant: TELEFONAKTIEBOLAGET LM ERICSSON (PUBL), Stockholm (SE)

(72) Inventors: Karl Norrman, Stockholm (SE); Sven Gemski, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/915,096

(22) PCT Filed: Dec. 1, 2015

(86) PCT No.: PCT/EP2015/078119
§ 371 (c)(1),
(2) Date: Feb. 26, 2016

(87) PCT Pub. No.: WO2016/087398
PCT Pub. Date: Jun. 9, 2016

(65) Prior Publication Data
US 2016/0360413 A1 Dec. 8, 2016

Related U.S. Application Data

(60) Provisional application No. 62/088,097, filed on Dec. 5, 2014.

(51) Int. Cl.
*H04W 12/08* (2009.01)
*H04W 12/12* (2009.01)
(Continued)

(52) U.S. Cl.
CPC ........ *H04W 12/08* (2013.01); *H04L 63/0876* (2013.01); *H04L 63/126* (2013.01);
(Continued)

(58) Field of Classification Search
CPC ........ H04W 8/08; H04W 12/08; H04W 48/18
See application file for complete search history.

(56) References Cited

U.S. PATENT DOCUMENTS

2011/0103277 A1* 5/2011 Watfa ............... H04W 36/0022
370/310
2013/0287007 A1 10/2013 Wu et al.

OTHER PUBLICATIONS

International Search Report and Written Opinion dated Feb. 10, 2016, in International Application No. PCT/EP2015/078119, 11 pages.
(Continued)

Primary Examiner — Myron K Wyche
(74) Attorney, Agent, or Firm — Rothwell, Figg, Ernst & Manbeck, P.C.

(57) ABSTRACT

A method (30) is provided for a first network node (22) of ensuring validity of a service request. The method (30) comprises receiving (31), from a second network node (13), a first piece of information relating to a destination identifier of the service request; receiving (32), from a communication device (12), a request for the service, the request comprising a second piece of information relating to the destination identifier; and determining (33) the service request to be valid if establishing a correspondence of the first piece of information with the second piece of information, else determining the service request to be invalid. Methods in a second network node (13) and in a communications device (12) are also provided and corresponding devices.

31 Claims, 6 Drawing Sheets

(51) Int. Cl.
*H04W 36/00* (2009.01)
*H04W 76/02* (2009.01)
*H04L 29/06* (2006.01)
*H04W 48/18* (2009.01)

(52) U.S. Cl.
CPC ....... *H04W 12/12* (2013.01); *H04W 36/0022* (2013.01); *H04W 48/18* (2013.01); *H04W 76/026* (2013.01)

(56) References Cited

OTHER PUBLICATIONS

3GPP, 3rd Generation Partnership Project; Technical Specification Group Services and System Aspects; Enhanced Circuit Switched (CS) Fallback; (Release 13) 3GPP Standard; 3GPP TR 23.772 V0.2.0, 2014, 40 pages.
3GPP, 3rd Generation Partnership Project; Technical Specification Group Services and System Aspects; Circuit Switched (CS) fallback in Evolved Packet System (EPS); Stage 2 (Release 12) 3GPP Standard; 3GPP TS 23.272 V12.4.0, 2014, 100 pages.

* cited by examiner

METHODS, NODES AND DEVICES FOR ENSURING SECURITY OF SERVICE REQUESTS

CROSS REFERENCE TO RELATED APPLICATION(S)

This application is a 35 U.S.C. §371 National Phase Entry Application from PCT/EP2015/078119, filed Dec. 1, 2015, designating the United States, and also claims the benefit of U.S. Provisional Application No. 62/088,097, filed Dec. 5, 2014. The disclosures of both applications are incorporated herein in their entirety by reference.

TECHNICAL FIELD

The technology disclosed herein relates generally to the field of wireless communication and in particular to service requests, such as circuit switched calls, and security of such service requests.

BACKGROUND

A wireless network conforming to Long Term Evolution (LTE) standard is a radio technology that is eventually intended to provide all services in a packet switched (PS) domain. However, circuit switched voice calls (denoted voice calls for short in the following) are still supported by 2G and 3G networks on behalf of the LTE network, and a mobile terminal having a LTE-subscription and making or receiving a voice call is therefore redirected to the 2G or 3G network.

In such situation, when the mobile terminal is connected to the packet switched network LTE, a function known as Circuit Switched Fall Back (CSFB) function allows the LTE network to set up Mobile Originating (MO) voice calls using the Circuit Switched (CS) domain of the 2G or 3G network, for instance GSM EDGE radio access networks (GERAN) or Universal Terrestrial Radio Access Network (UTRAN) used by Universal Mobile Telecommunications Systems (UMTS).

The CSFB function, described e.g. in TS 23.272 (Release 12, V12.4.0), directs the LTE mobile terminal to the 2G or 3G network for call setup processes, and the call remains in the CS domain until it is completed.

A drawback with the current 2G and 3G network specifications relating to the CSFB is that there is a requirement to run authentication in the CS domain using the Authentication and Key Agreement (AKA) protocol relatively often when setting up CSFB calls. To run the AKA protocol adds significantly to the call setup time.

FIG. 1 is a simplified signaling sequence illustrating setup of a regular Mobile Originated CSFB (MO CSFB) call, summarized in a few steps. The mobile terminal (MT) 1 is first registered to the Mobile Management Entity (MME) 2 of the LTE network, as indicated at arrow A1. This registration comprises authentication, identity check and security key update. Next, indicated at arrow A2, the MT 1 sends an extended Non-Access Stratum (NAS) service request to the MME 2. The MME 2 informs the Mobile Switching Centre (MSC) 3 of the 2G or 3G network about a coming CSFB call (arrow A3). In response, the MSC 3 allocates resources for the call (arrow A4). Next, indicated by arrow A5, the MT 1 sends a call management (CM) service request to the MSC 3 for establishing the call. Finally, indicated by arrow A6, the MSC 3 sets up the MO CSFB call.

SUMMARY

An objective is to improve security of service requests, while simplifying the providing of the service by alleviating the need to run authentication procedures.

The objective is according to an aspect achieved by a method for a first network of ensuring validity of a service request. The method comprises receiving, from a second network node, a first piece of information relating to a destination identifier of the service request; receiving, from a communication device, a request for the service, the request comprising a second piece of information relating to the destination identifier; and determining the service request to be valid if establishing a correspondence of the first piece of information with the second piece of information, else determining the service request to be invalid.

The objective is according to an aspect achieved by a computer program for a first network node for ensuring validity of a service request. The computer program comprises computer program code, which, when executed on at least one processor on the first network node causes the first network node to perform the method as above.

The objective is according to an aspect achieved by a computer program product comprising a computer program as above and a computer readable means on which the computer program is stored.

The objective is according to an aspect achieved by a first network node for ensuring validity of a service request. The first network node is configured to perform the method as above. In particular, the first network node is configured to receive, from a second network node, a first piece of information relating to a destination identifier of the service request; receive, from a communication device, a request for the service, the request comprising a second piece of information relating to the destination identifier; and determine the service request to be valid if establishing a correspondence of the first piece of information with the second piece of information, else determining the service request to be invalid.

The objective is according to an aspect achieved by a method for a second network node of securing validity of a service request. The method comprises receiving, from a communication device, a service request comprising a first piece of information relating to a destination identifier of the service request; and transmitting, to a first network node, the first piece of information relating to a destination identifier of the service request, or a derivative of the first piece of information, enabling the first network node to establish a correspondence between the first piece of information and a second piece of information.

The objective is according to an aspect achieved by a computer program for a second network node for ensuring validity of a service request. The computer program comprises computer program code, which, when executed on at least one processor on the second network node causes the second network node to perform the method as above.

The objective is according to an aspect achieved by a computer program product comprising a computer program as above and a computer readable means on which the computer program is stored.

The objective is according to an aspect achieved by a second network node for securing validity of a service request. The second network node is configured to perform the method as above. In particular, the second network node is configured to receive, from a communication device, a service request comprising a first piece of information relating to a destination identifier of the service request, and transmit, to a first network node, the first piece of information relating to a destination identifier of the service request, or a derivative of the first piece of information, enabling the first network node to establish a correspondence between the first piece of information and a second piece of information.

The objective is according to an aspect achieved by a method for a communication device of ensuring validity of a service request. The method comprises transmitting, to a second network node, a first piece of information relating to a destination identifier of the service request; and transmitting, to a first network node, a request for the service, the request comprising a second piece of information relating to the destination identifier.

The objective is according to an aspect achieved by a computer program for a communication device for ensuring validity of a service request. The computer program comprises computer program code, which, when executed on at least one processor on the communication device causes the communication device to perform the method as above.

The objective is according to an aspect achieved by a computer program product comprising a computer program as above and a computer readable means on which the computer program is stored.

The objective is according to an aspect achieved by a communication device for securing validity of a service request. The communication device is configured to perform the method as above. In particular, the communication device is configured to transmit, to a second network node, a first piece of information relating to a destination identifier of the service request, and transmit, to a first network node, a request for the service, the request comprising a second piece of information relating to the destination identifier.

DETAILED DESCRIPTION

Figure 1:
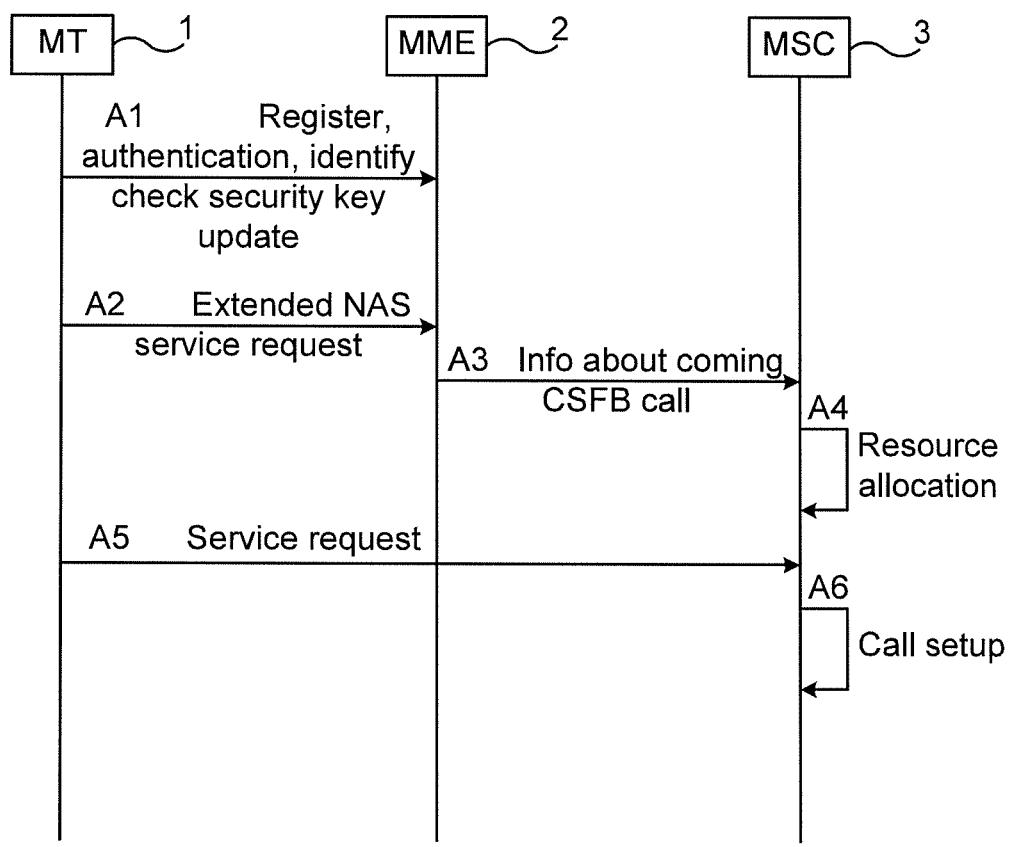
FIG. 1 is a signaling sequence diagram illustrating setting up of circuit switched fallback call.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The existing solution suggests that the MSC 3 should refrain from initiating an Authentication and Key Agreement (AKA) procedure in the CS domain for every MO CSFB call, and instead run it for every n:th call that a particular MT 1 makes. This works well when the CS domain is UTRAN, since the UTRAN provides integrity protection for the control plane traffic, and the integrity protection gives assurance to the MSC 3 that the messages received indeed originates from the MT 1 claimed. If the MSC 3 detects that the control plane traffic fails the integrity verification checks, e.g., because the traffic is modified or injected by an attacker, the MSC 3 can simply refuse to establish the requested MO CSFB call.

However, in the GERAN there is no integrity protection and the encryption is often disabled or weak encryption algorithms are used. If an attacker can break the encryption key, which in recent years has proved to be possible, then the attacker can impersonate the MT 1 towards the GERAN network and establish CS calls even when the real MT 1 is not in the vicinity. Because of this, the authentication procedure, AKA, can sometimes be the last resort for the operator to ensure that the correct MT 1 is at least present in the area when the CS call is established. A reason that a successful AKA protocol run provides evidence that the correct MT 1 is in the area is that the AKA protocol involves calculations that can only be performed by an entity that is in possession of a correct key K stored in an Universal Subscriber Identity Module (USIM) card of the MT 1. The USIM card is a trusted smart card inserted in the MT 1 and containing the key K which is subscriber unique. If a trusted execution environment is present in the MT 1, the key K may be stored there instead of in the USIM card. The important fact, from the AKA procedure point of view is that the key K is only present in the legitimated MT 1. AKA is commonly run as often as for every CS call and CSFB call set-up. Running AKA during the setup of a CSFB call increases the call setup time significantly, and this delay has been described as problematic by many operators.

3GPP working group SA2 has initiated a study in TR 23.772 (Vo.2.2, Release 13). It contains seven solution proposals aimed at reducing the CSFB call setup time. Some of the solutions try to reduce the need for running AKA during CSFB setup, whereas others deal with other optimizations, e.g. in view of cell selection.

Aspects of the present disclosure may be implemented in some of these seven solutions. This would provide an increased CS call security to these solutions, which aimed at reducing the need to run AKA. These solutions are therefore briefly described in the following.

Solutions#1 and #2 require use of the Single Radio Voice Call Continuity (SRVCC) functions in both the 2G/3G network and in the MT 1. These functions require relatively complex signaling and key derivations in addition to what is needed for conventional CSFB. While they do remove the need for running AKA in the CS domain, they require that the MT 1 is brought up to connected state in LTE and that a PS to CS handover is performed before the CSFB call can be established. It is not even clear that this would save CSFB call setup time taken all together.

Solution#3 outlines how some configuration information can be provided by an evolved NodeB (eNB) of the LTE network to the MT 1. It is not clear from the description of Solution #3 what information would be included or how this would help to counter the need for running AKA in the CS domain.

Solution#4 is, just like Solution#3, not targeted at reducing the need for running AKA; it deals with effective cell selection.

Solution#5 notes that Authentication (subscription) and identity check (of MT) are also done by the MME 2 so these procedures can therefore be selectively skipped by the MSC 3. Solution#5 consists of the MME 2 informing the MSC 3 that the MT 1 is already authenticated by the MME 2 and that a CSFB call is incoming to the MSC 3 from a given MT 1. However, this solution allows an attacker to initiate a voice call in the CS domain on behalf of the victim MT 1 during the time window the MSC 3 is prepared to receive the call setup message from the MT 1.

Solution#6 depends on whether or not an IP multimedia subsystem (IMS) is implemented in the 2G/3G network. This is not always the case. The solution further relies on SRVCC similar to Solutions #1 and #2. In Solution#6, the MME 2 provides the MSC 3 with a set of CS keys derived from the currently active PS keys in the MME 2. The MME 2 may do this at the same time as the MSC 3 receives the indication of that a CSFB call will be incoming. The ME 1 derives the same CS keys. The main idea is that since the MSC 3 and the ME 1 will now share CS keys they can immediately start security procedure. While this is correct, it does not take into account the fact that one of the purposes of running AKA in GERAN is to establish that the correct MT 1 is in the vicinity, as described earlier and noting that a main purpose of running AKA in GERAN is to ensure that the unique USIM is present in the MT 1.

All the suggested solutions thus allow an attacker to inject a CM service request message to the MSC 3 when a legitimate mobile terminal has started to establish a CSFB call. The attacker can then perform call fraud by sending a CM service request to the MSC 3 blocking the request from the legitimate mobile terminal.

Besides the call set up time being long there is also this drawback of lack of security of CSFB calls.

An objective of the present disclosure is to solve or at least alleviate at least one of the above mentioned problems.

The objective is according to various aspects achieved by methods in network nodes and a method in a communication device, and by network nodes such as MME and MSC, and by a communication device.

In different aspects and embodiments, the present disclosure increases the security of circuit switched calls, in particular when the circuit switched call service is provided by a network other than the network towards which the call service request was initially made, e.g. as a CSFB function provided by a 2G/3G network to an LTE network. The present disclosure renders the circuit switched call more difficult to intercept by a malicious attacker intending to make e.g. a premium rate call, which entails very high costs. The present disclosure provides increased protection against call fraud without increasing the call setup time.

Further features and advantages of the present disclosure will become clear upon reading the following description and the accompanying drawings.

Briefly, in various aspects and embodiments, the present disclosure reduces the value for an attacker to attempt call fraud using CSFB by limiting the numbers which the attacker can call.

This is achieved by the mobile terminal informing the MME about which number it wishes to call. The MME in turn informs the MSC about this number. The MSC will then only accept setting up a call from that given mobile terminal to that given number during a short period of time. Any other CSFB call setups will be rejected.

Figure 2:
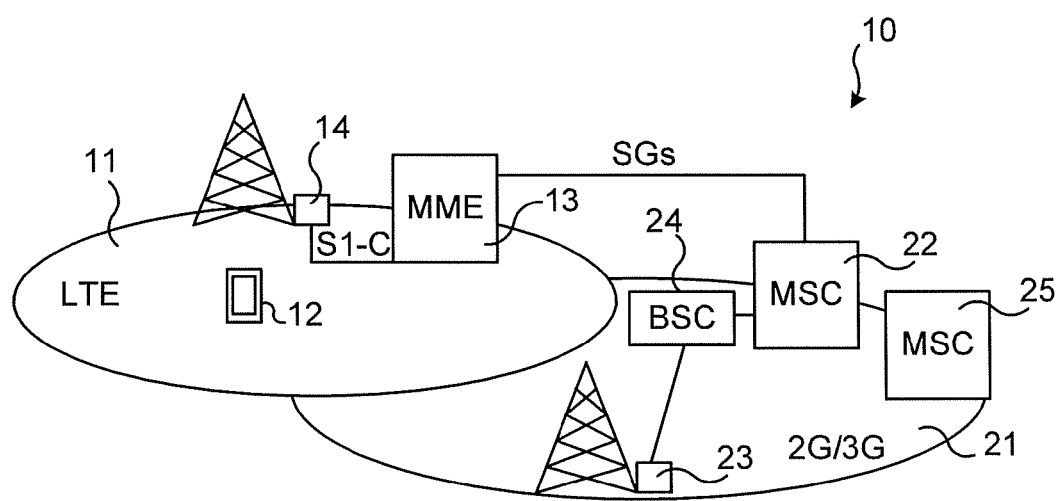
FIG. 2 illustrates schematically an environment in which embodiments of the present disclosure may be implemented.

FIG. 2 illustrates schematically an environment in which embodiments of the present disclosure may be implemented.

The wireless system 10 comprises a first wireless network 21, in particular a network providing CSFB for communication devices 12 having a subscription in a second wireless network 11, e.g. a LTE network 11. Examples of such first wireless networks 21 comprise 2G and 3G networks such as for instance GSM EDGE radio access networks (GERAN) or Universal Terrestrial Radio Access Network (UTRAN) used by Universal Mobile Telecommunications Systems (UMTS).

The first wireless network 21 comprises at least one Mobile Service Center (MSC) 22. A second MSC 25 is also illustrated. The MSC 22 is responsible for routing voice calls and Short Message Service (SMS) as well as other services such as conference calls and circuit switched data. The MSC 22 handles handover (inter-MSC and intra-MSC handovers as well as Base Station Controller, BSC, handovers). The MSC 22 sets up and releases the end-to-end connection, handles mobility and handover requirements during the call. The MSC 22 performs various other known functions which are defined in standards, and will not be discussed further.

The first wireless network 21 also comprises radio access nodes 23, which are often denoted base stations or base transceiver stations. The radio access node 23 provides wireless communication for the communication devices residing within its coverage area over a radio interface, e.g. Um interface.

The first wireless network 21 comprises still additional nodes and devices as is well known. For instance, the first wireless network 21 may comprise a Base Station Controller (BSC) 24, connected to the radio access nodes as well as to the MSC 22, and which thus interconnect the radio access nodes 23 with the MSC 22.

It is noted that the network nodes may be denoted differently depending on which standard is implemented in the first wireless network 21. The given vocabulary refers to GSM, but the present disclosure is not limited to this particular example.

A wireless system 1 comprises a second wireless network 11, in particular a purely packet switched network 11 such as for example an LTE network, a Wi-Fi/Wireless Local Area Network (WLAN), an Ethernet based fixed access network or a Wimax network. In the following LTE network is used for exemplifying the packet switched network 11.

The LTE network 11 comprises a number of communication devices 12, often termed User Equipment (UE) in the context of LTE. It is noted that the communication device 12 may be denoted in various other ways as well, e.g. mobile terminal, mobile entity, mobile device. The communication device 12 may be any type of communication device able to set up CS calls, for instance a smart phone, mobile phone, non-mobile vending machine etc. The CS calls is intended to encompass both CS data calls as well as CS voice calls. It is further noted that the communication device 12 may set up other types of service requests, the security of which may also be increased by the present teachings, as is described later. The communication device 12 may for instance act as a client and request a service from a server, e.g. a server that is part of a cluster of servers.

The LTE network 11 comprises a Mobility Management Entity (MME) 13. The MME 13 is part of an evolved packet core and controls LTE radio access networks. The MME 13 is for instance responsible for idle mode paging, activation/ deactivation of bearers, initial attach procedures and for authenticating the communication device 12. The MME 13 also generates and allocates temporary identities to the communication device 12. Non-Access Stratum (NAS) signaling terminates at the MME 13 as does ciphering/integrity protection for NAS signaling. The MME 13 also handles security key management. The MME 13 further provides control plane functionality for mobility between LTE and 2G/3G access networks. The MME 13 performs various other known functions which are defined in standards, and will not be discussed further.

The LTE network 11 also comprises radio access nodes 14, denoted evolved Node Bs (eNBs). The eNB 14 provides wireless communication for the communication devices 12 over a radio interface called evolved UMTS Terrestrial Radio Access (E-UTRA).

From the above it is clear that the communication device 12 is connectable both to the MME 13 of the LTE network 11 as well as to the MSC 22 of the first wireless network 21. In particular, the communication device 12 is connectable to the MME via the radio interface (E-UTRA) to the eNB 14 and then an interface S1-c between the eNB 14 and the MME 13, and connectable to the MSC 22 via the radio interface (Um) to the radio access node 23 of the first wireless network 21, an interface Ab is between the radio access node 23 and the BSC 24 and an A interface between the BSC 24 and the MSC 22.

The MME 13 of the second wireless network 11 and the MSC 22 of the first wireless network 21 are interconnected by an interface denoted SGs.

As explained earlier, when the MSC 22 is expecting the CM service request from the communication device 12, attackers can interject with their own CM services requests. Assuming the attacker has already previously broken the GSM encryption, or that no encryption is used by the network, the attacker can then continue to set up a call to any destination he or she pleases, at the expense of the legitimate communication device 12.

The integrity of the CM service request could be protected in the signaling from the communication device 12 to the MSC 22. This would however entail relatively large modifications to the existing protocols and is therefore not an attractive solution.

In an embodiment of the present disclosure, a cryptographic token, e.g. a keyed cryptographic hash is inserted over an identifier of the communication device 12 and some keying material derived from the keys used between the communication device 12 and the MME 13. For instance, LTE security is based on a secret key shared by the MME 13 and the communication device 12, e.g. the earlier mentioned secret key programmed on the USIM. Such PS keys of LTE may be used for computing a token which may be presented to the MSC 22 by the communication device 12 and by the MME 13. The MME 13 is thereby able to compute the cryptographic token since it has the necessary inputs, and it may then forward the cryptographic token to the MSC 22. The MSC 22 can then compare it to the cryptographic token received from the communication device 12 and verify that the CSFB call is indeed for the authenticated communication device 12. Since an attacker is not assumed to be able to break the security of LTE, he or she cannot compute the cryptographic token. This embodiment thus improves security for CSFB calls. However, it is conceivable that the attacker could capture the CM service request sent by the communication device 12 thereby stopping it from reaching the MSC 22. The attacker can then insert the cryptographic token into its own CM service request when setting up a call elsewhere. The legitimate communication device 12 is thereby hindered to make his call. In other embodiments of the present disclosure, also call fraud in this way is prevented.

Figure 3:
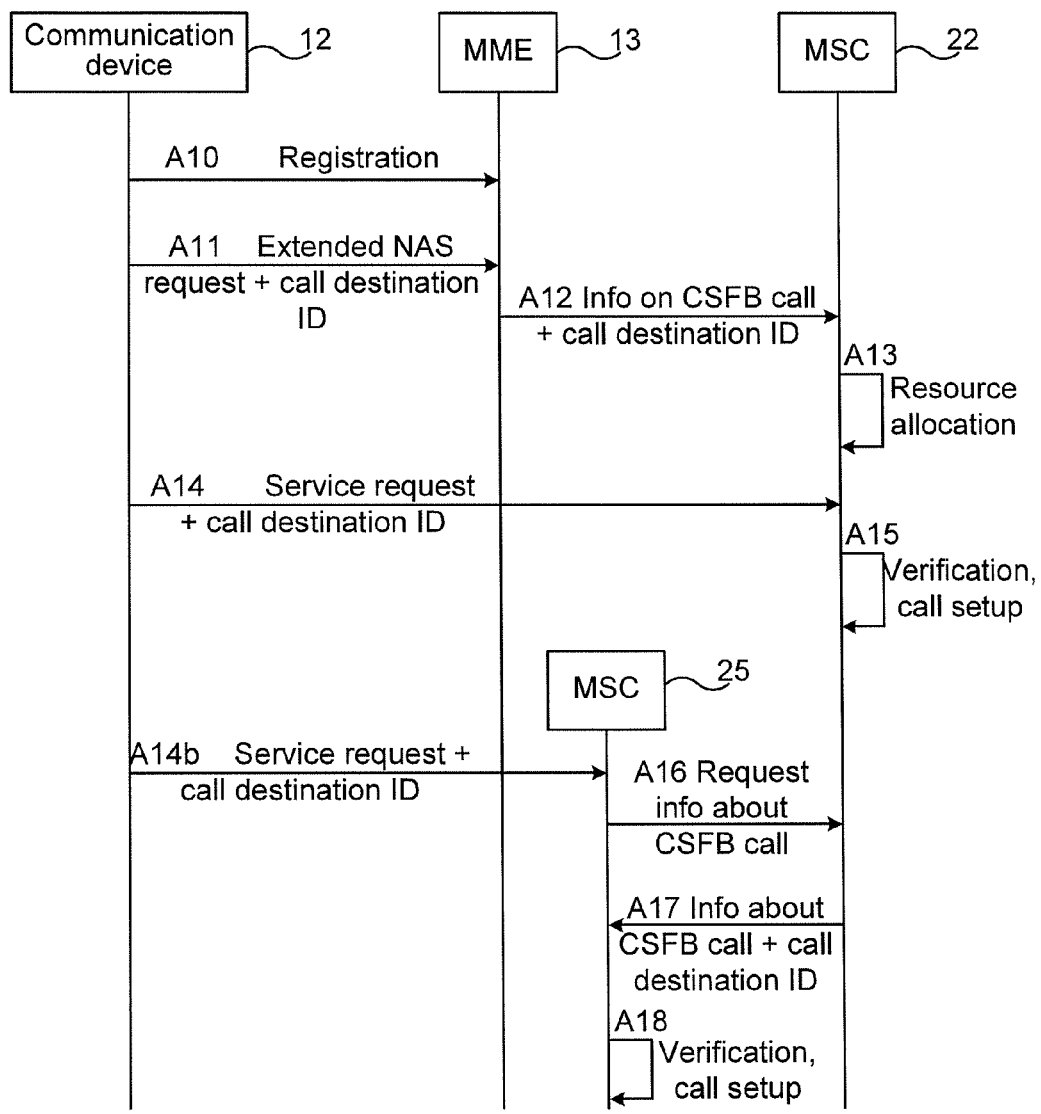
FIG. 3 is a signaling sequence diagram illustrating setting up of a mobile originated circuit switched fallback call according to an aspect of the present disclosure.

FIG. 3 is a signaling sequence illustrating setup of a Mobile Originated CSFB (MO CSFB) call according to an aspect of the present disclosure. It is noted that this signaling sequence is highly summarized and that various additional signaling messages are typically exchanged. For sake of brevity, only signaling relevant for understanding the various embodiments of the present disclosure is shown.

It is also noted that this is a particular example of an environment in which aspects of the present disclosure may be implemented. The teachings of the present disclosure enable securing validity of other service requests as well, and such service request is exemplified in the following by a CSFB call.

The communication device 12 performs an Evolved Packet System (EPS) registration (arrow A10) by performing an attach procedure. The communication device 12 is then registered to the MME 13 of the LTE network 11. This registration comprises authentication, identity check and security key update and the communication device 12 can now receive services that requires registration in the EPS.

Next, at arrow A11, the communication device 12 sends an extended Non-Access Stratum (NAS) service request to the MME 13. It is noted that the NAS service request is integrity protected between the communication device 12 and the MME 13. The integrity protection is based on the LTE PS keys. That is, the keys that were derived when the MME 13 and the communication device 12 performed mutual authentication, which is typically performed when the communication device 12 registers with the MME 13. The communication device 12 makes a resource request, in the following exemplified by a MO CSFB call, wherein security is assured through the integrity protection of the extended NAS service request. According to the present disclosure, the communication device 12 inserts an additional piece of information to the extended NAS request. This piece of information may, in different embodiments, comprise for instance a cryptographic token, output of an one-way function, etc. In a preferred embodiment, the piece of information that is inserted comprises or is derived from an identifier of the destination of the requested call, for instance destination phone number. In the FIG. 3 this piece of information is exemplified by "call destination ID". For other types of services, other service requests identifiers may be used.

The MME 13 (of the second wireless network 11) informs the MSC 22 (of the first wireless network 21) about an upcoming CSFB call (arrow A12). The MME 13 also provides to the MSC 22 the piece of information that it received from the communication device 12, or some variation of this piece of information.

In response, the MSC 22 may allocate resources for the call (arrow A13).

Next, indicated by arrow A14, the communication device 12 sends a call management (CM) service request to the MSC 22 for establishing the call. This service request also comprises the mentioned piece of information. According to known art, the communication device 12 sends the destination phone number to the MSC 22 in order for the MSC 22 to know the called party. In some embodiments of the present disclosure, the service request signaling (arrow A14) according to prior art may be used.

Finally, indicated by arrow A15, the MSC 22 may set up the MO CSFB call after having performed the verification according to the present disclosure. The MSC 22 has received additional information from the MME 13 as well as information in the service request from the communication device 12, arrows A12 and A14, respectively. These pieces of information are compared to each other and correspondence verifies legitimacy (/validity) of the voice call. If the information matches then the call is set up. Thereby security of circuit switched calls is highly increased. Legitimacy of a voice call is intended to mean validity in the sense that it is the communication device 12 of the legitimate subscriber, i.e. the party paying for the requested service that indeed is provided the requested service. Legitimacy of a voice call is verified by finding the described correspondence, and hence it is verified that it is the legitimate subscriber that is provided the voice call service.

In the following different embodiments of the above are described.

In an embodiment of the present disclosure, the communication device 12 informs the MME 13 about the intended destination of the call. This may be done in the extended NAS service request, which is thus amended by introduction of a new information element. The information about the intended destination of the call may comprise e.g., a phone number or Session Initiation Protocol (SIP) Uniform Resource Identifier URI, or a derivative thereof such as a hash or key derivation function which takes a phone number or SIP URI or similar as one of the inputs. An advantage of using e.g. a hash of the phone number is that a reduced amount of data is to be sent over the radio interface, thus saving typically scarce radio resources.

The MME 13 may then forward the received call destination to the MSC 22 (arrow A12 of FIG. 3). When the communication device 12 then sends the CM service request (arrow A14 of FIG. 3) to the MSC 22, the MSC 22 can verify that the CSFB call is set up to the destination that the communication device 12 indicated to the MME 13 over the secure LTE connection. The MSC 22 may also be configured to stop accepting calls to the given destination after a certain period of time. That is, besides the MSC 22 only accepting requests having matching destination identifications, it may do this only during a limited period of time, hence further increasing the security.

This severely limits the attacker's use of CSFB for call fraud. The attacker can only set up a call to the exact destination that the communication device 12 already indicated it wanted to establish a call with. Hence, implementations of the present disclosure renders it more difficult to perform call fraud based on CSFB than it would be to e.g. perform call fraud on GSM directly, e.g. by breaking the GSM encryption for a GSM subscriber and simply establish a normal GSM call to a premium number on behalf of the subscriber.

In various embodiments, the MME 13 may provide the MSC 13 with a range or set of allowed destination call numbers (or representations thereof). All destination call numbers in the range or set would then be accepted by the MSC 13. For instance, a user may have selected a certain set of phone numbers to which calls are allowed to be made. In case the MSC 22 then receives a request (assumingly) from the communication device 12 that comprises a phone number not included in the selected set, then the MSC 22 may reject the call request. As another example, the communication device 12 may comprise a personal alarm device carried on the body of a person. Such personal alarm device may have LTE connectivity for remote management, and for sending data. However, if a certain condition is met, e.g. the personal alarm device detects that the person has fallen to the floor, the personal alarm device may establish a circuit switched call to an emergency central, e.g. dialing 911 in the United States or 112 in Europe. A purpose of establishing the emergency call could be to allow the person in need to easily talk to emergency personnel even if wounded and/or immobile. The personal alarm device only calls a single, specific number (of the emergency central) and then a pre-configuration may be used allowing only calls from the personal alarm device to the emergency central.

In various embodiments, the "destination call number" that the MME 13 receives from the communication device 12 and passes to the MSC 22 need not be the same as the one that the communication device 12 presents to the MSC 22. It is sufficient that the MSC 22 can securely deduce that they represent the same destination. For example, the MME 13 may send a hash of a phone number to the MSC 22 while the communication device 12 may include the phone number itself to the MSC 22 (i.e. as in prior art). In that case the MSC 22 can simply hash the phone number received from the communication device 12 and check whether the output of the hash function is equal to the hash value received from the MME 13.

Another variation is that both the MME 13 and the communication device 12 provide derivatives of the destination call number to the MSC 22, and that the MSC 22 is able to relate the two derivatives so as to verify that they indicate the same destination call number. As mentioned earlier, the communication device 12 would then use fewer radio resources than if sending the destination call number itself, thus saving typically scarce radio resources.

FIG. 3 also illustrates a case wherein the communication device 12 sends (arrow A14b) the CS service request to a second MSC 25 instead of the (first) MSC 22 (which is a possibility according to TS 23.272). The second MSC 25 would then request (arrow A16) information about the CSFB call from the first MSC 22. The information about the call destination (indicated "call destination ID" in the figure) is then forwarded (arrow A17) from the second MSC 25 to the (first) MSC 22. According to the present disclosure, the call destination ID is inserted in the message (arrow A17) from the (first) MSC 22 to the second MSC 25. The second MSC 25 may then perform the verification and set up the call (arrow A18).

The present disclosure provides several advantages. In some embodiments, only minor modifications to the standards and implementations are required, hence being easily adoptable.

Instead of an attacker being able to make a call to any desired number, the present disclosure enables to limit the attacker to be able to make calls to the number a given communication device is already trying to set up a call to. This severely limits the incentive and usefulness for the attacker to inject a CM request and will thereby reduce the risk for call fraud. None of the existing proposals provide such possibility when suggesting that the AKA can be skipped. The various embodiments of the present disclosure can be combined with some of the existing solutions for providing additional security.

Further, embodiments of the present disclosure only affects the signaling for the mobile initiated calls, and these are also the ones which are by far the most valuable for an attacker to commit call-fraud.

The features that have been described, as well as features described in the following, may be combined in different ways, examples of which are given in the following with reference to FIG. 4.

Figure 4:
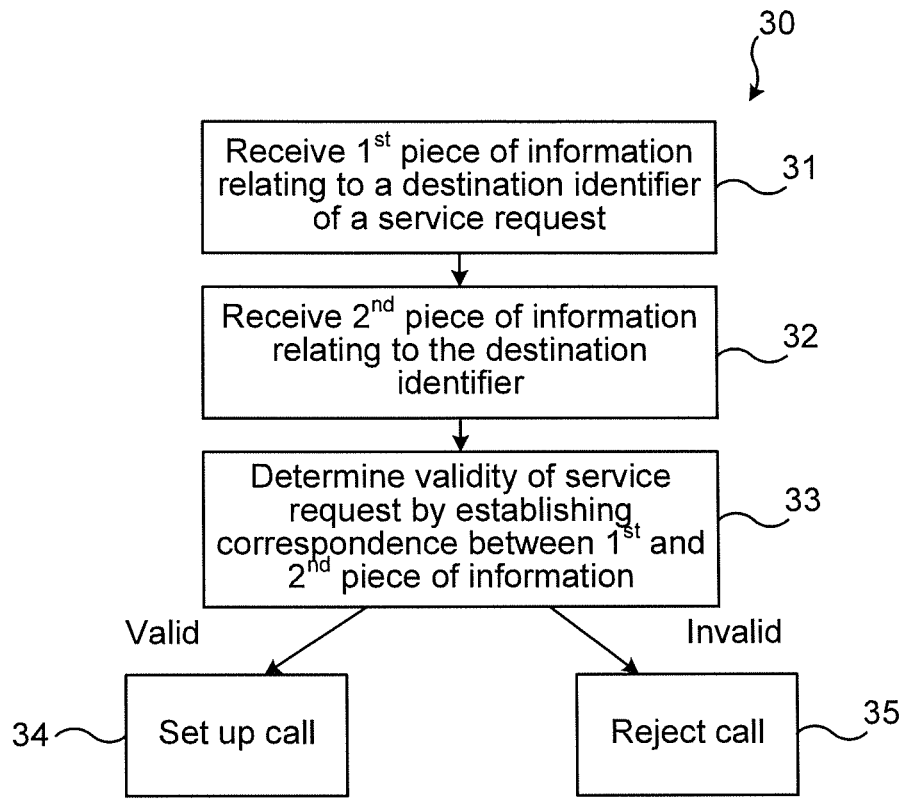
FIG. 4 illustrates a flow chart over steps of a method in a first network node in accordance with the present disclosure.

FIG. 4 illustrates a flow chart over steps of a method for ensuring validity of a service request performed in a first network node in accordance with the present disclosure. The method 30 may for instance be implemented in a MSC 22 of the first wireless network 21. The method 30 may be implemented in order to increase the security of voice calls using the Circuit Switched (CS) domain of the first wireless network 21, for instance MO CSFB calls. Such voice call service may e.g. be requested by a communication device 12. It is however noted that the teachings of the present disclosure are applicable also to other scenarios, for instance for ensuring validity of other service requests or resource requests, for instance data services such as Short Message Service (SMS), which service could also be requested by the communication device 12.

As another example, the first network node may be a server of a cluster of servers, e.g. a server of the Internet ("web-server") or any application server, and a device requesting a service may be any client. The client may register which services (/resources) in the webserver that it should be allowed to access.

The method 30 comprises receiving 31, from a second network node 13, information relating to a call destination of a requested CS call.

A method 30 is provided for ensuring validity of a service request. The method 30 may be performed in a first network node 22, such as a network node of a 2G or 3G network, e.g. a MSC of a GSM network. As another example, the method 30 may be performed in a server, e.g. an application server, of a computer network, e.g. Internet.

The method 30 comprises receiving 31, from a second network node 13, a first piece of information relating to a destination identifier of the service request.

The method 30 comprises receiving 32, from a communication device 12, a request for the service, the request comprising a second piece of information relating to the destination identifier.

The method 30 comprises determining 33 the service request to be valid if establishing a correspondence of the first piece of information with the second piece of information, else determining the service request to be invalid. The first network node 22 may establish the correspondence in various ways, depending on the type of information that the first and second pieces of information are. In a simple example, the first piece of information is a phone number and the second piece of information is also a phone number, and if they are equal, i.e. the same phone number, then the first network node establishes that there is a correspondence between them and that the service request is valid.

As a particular example case, the method 30 is performed in a MSC 22 for ensuring validity of a circuit switched call, and comprises receiving 31, from a second network node 13, a first piece of information relating to a call destination of the circuit switched call. For instance, the first piece of information may relate to a called party (the called party hence being the call destination) and may for instance be a phone number. The MSC 22 also receives 32, from a communication device 12, a request for the circuit switched call, the request comprising a second piece of information relating to the call destination. The MSC 22 determines 33 the circuit switched call to be valid if establishing a correspondence of the first piece of information with the second piece of information, else it determines the service request to be invalid.

In an embodiment, the method 30 comprises setting up 34 the service of the service request when determining 33 the service request to be valid and rejecting 35 the service request when determining the service request to be invalid. This is indicated in FIG. 4 at box 34 (service valid) and box 35 (service not valid, i.e. invalid).

In an embodiment, the first piece of information comprises a first phone number of the destination, and wherein the second piece of information comprises a second phone number of the call destination, and the determining 33 comprises determining the service request to be valid if the first piece of information is equal to the second piece of information.

In another embodiment, the first piece of information comprises a derivative of a phone number of the destination, and wherein the second piece of information comprises a phone number of the destination, and the determining 33 comprises deriving a third piece of information from the second piece of information and determining the service request to be valid if the derivative of the third piece of information is equal to the first piece of information.

In still another embodiment, the first piece of information comprises a phone number of the destination, and wherein the second piece of information comprises a derivative of a phone number of the destination, and the determining 33 comprises deriving a third piece of information from the first piece of information and determining the service request to be valid if the derivative of the third piece of information is equal to the second piece of information.

The first piece of information received from the second network node 13 may comprise e.g. a derivative of the phone number, wherein the derivative is obtained e.g. by inputting the phone number to a hash function or a one-way function. The second piece of information received from the communication device 12 may be the plain phone number or it may also be a derivative of the phone number obtained e.g. in the same way as the first piece of information. In other embodiments, the communication device 12 may send a function $f(x)$ to the second network node 13 (e.g. MME), which calculates a function g of $f(x)$ and y, i.e. $g(f(x), y)$, wherein y is a parameter known both by the first and the second network nodes 13, 22. The second network node 13 may transmit the result of $g(f(x), y)$ to the first network node 22 as the first piece of information. The second piece of information, sent from the communication device 12 to the first network node 22, may be the function $f(x)$. The first network node 22 may then establish validity of the service request by calculating $g(f(x), y)$ based on the $f(x)$ received from the communication device 12 and compare it to the first piece of information (i.e. the result of $g(f(x), y)$ as calculated by the second network node 13). It there is a correspondence, if they are equal in this case, then the service request is determined to be valid, if they differ, then the service request is determined to be invalid.

From the various embodiments described above, it is clear that there are various ways of establishing validity, depending on the first and second pieces of information.

In various embodiments, the determining 33 is to be made within a set period of time. The time period may be configurable, and set by an operator of the first wireless network 21.

In a variation of the previous embodiment, the service request is rejected if the duration during which the determining 33 is made is longer than the set period of time. This embodiment improves on the security even further, since service requests are automatically rejected after a certain period of time.

In various embodiment, the method 30 comprises obtaining a set of destination identifiers to which services of the service requests are allowed to be set up for the communication device 12 and wherein the determining 33 comprises determining the service request to be valid if the second piece of information comprises a destination identifier in the obtained set of destination identifiers. This embodiment limits the motivation for attempting to perform a call fraud, as the service request can only be requested to a number of specified destination identifiers. For instance, the set of destination identifiers may be a set of specified phone numbers to which a circuit switched call may be set up or to which an SMS may be sent.

In particular embodiments, the service comprises a circuit switched call.

In a variation of the previous embodiment, the circuit switched call comprises a circuit switched fallback call provided by a first wireless network 21, and the second network node 13 comprises a network node of a second wireless network 11. For instance, the service may be a MO CSFB provided by a 2G or 3G network in behalf of a purely packet switched network, e.g. LTE.

Figure 5:
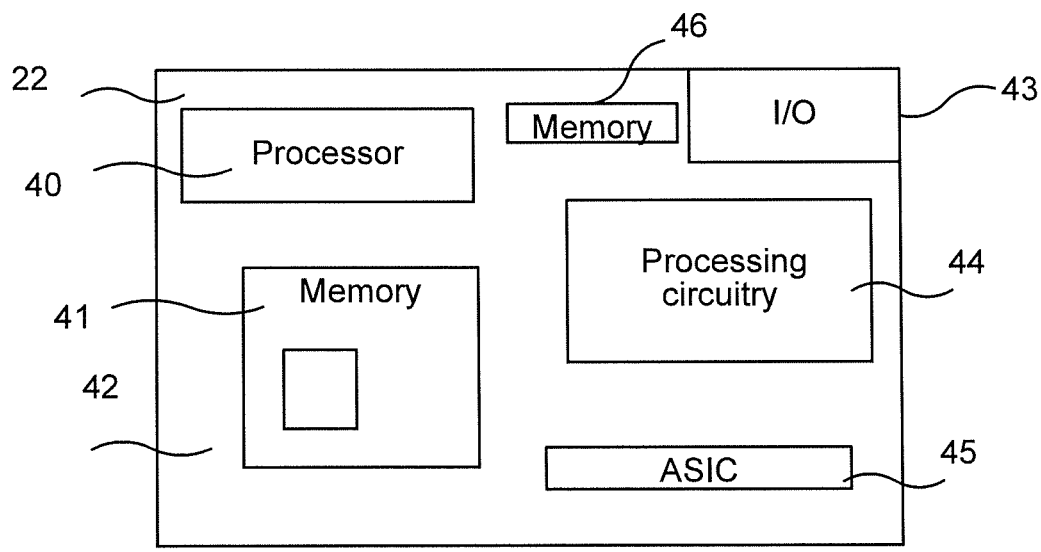
FIG. 5 illustrates schematically a first network node and means for implementing embodiments of methods of the present disclosure.

FIG. 5 illustrates schematically a first network node and means for implementing methods of the present disclosure. The various embodiments of the method 30 as described e.g. in relation to FIG. 4 may be implemented in the first network node 22. As has been described, the first network node 22 may be a node of a 2G or 3G network, such as MSC, or, as another example, it may be a server of a computer network.

The first network node 22 comprises a processor 40 comprising any combination of one or more of a central processing unit (CPU), multiprocessor, microcontroller, digital signal processor (DSP), application specific integrated circuit etc. capable of executing software instructions stored in a memory 41, which can thus be a computer program product 41. The processor 40 can be configured to execute any of the various embodiments of the method 30 for instance as described in relation to FIG. 4.

The memory 41 can be any combination of read and write memory (RAM) and read only memory (ROM), Flash memory, magnetic tape, Compact Disc (CD)-ROM, digital versatile disc (DVD), Blu-ray disc etc. The memory 41 also comprises persistent storage, which, for example, can be any single one or combination of magnetic memory, optical memory, solid state memory or even remotely mounted memory.

A data memory 46 may also be provided for reading and/or storing data during execution of software instructions in the processor 40. The data memory 46 can for instance be any combination of random access memory (RAM) and read only memory (ROM).

The first network node 22 may also comprise an input/output device 43, indicated by I/O in FIG. 5. The input/output device 43 may comprise an interface for communication exchange for instance with other network nodes, such as the second network node 13 or other entities of the first wireless network 21 or the second wireless network 11. The input/output device 43 may for instance comprise a communication protocol enabling communication between different nodes.

A first network node 22 is provided for ensuring validity of a service request. The first network node may comprise a node of a 2G or 3G network, e.g. a MSC of a GSM network. As another example, the first network node may comprise a server, e.g. an application server, of a computer network, e.g. Internet.

The first network node is configured to perform any of the embodiments of the method 30 that has been described with reference to FIG. 4. The first network node 22 may be configured to perform the steps of the described embodiments e.g. by comprising a processor 40 and memory 41, the memory 41 containing instructions executable by the processor 40, whereby the first network node 22 is operative to perform the steps.

The first network node may for instance be configured to:
receive, from a second network node 13, a first piece of information relating to a destination identifier of the service request,
receive, from a communication device 12, a request for the service, the request comprising a second piece of information relating to the destination identifier, and
determine the service request to be valid if establishing a correspondence of the first piece of information with the second piece of information, else determining the service request to be invalid.

The first network node 22 may configured to establish the correspondence in various ways, depending on the type of information that the first and second pieces of information are as have been described.

The present disclosure comprises a computer program 42 for a first network node 22 for ensuring validity of a service request. The computer program 42 comprises computer program code, which, when executed on at least one processor on the first network node 22 causes the first network node 22 to perform the method 30 as has been described.

A computer program product 41 comprising a computer program 42 as described above and a computer readable means on which the computer program 42 is stored is also provided.

The computer program product, or the memory, thus comprises instructions executable by the processor 40. Such instructions may be comprised in a computer program, or in one or more software modules or function modules.

FIG. 5 also illustrates an example of an implementation of the first network node 22 using function modules/software modules. In particular, FIG. 5 illustrates function modules for implementing embodiments of the method of the present disclosure. The means, e.g. function modules, can be implemented using software instructions such as computer program executing in a processor and/or using hardware, such as application specific integrated circuits (ASICs), field programmable gate arrays, discrete logical components etc., and any combination thereof. In FIG. 5, processing circuitry is illustrated at reference numeral 44, and an ASIC at reference numeral 45. The processing circuitry 44 may be adaptable and comprise for instance processing circuitry adapted to perform any of the steps of the methods that have been described. For example, the first network node 22 may comprise processing circuitry adapted to determine validity of a service request, e.g. by comparing a first piece of information to a second piece of information. The network node 22 may comprise processing circuitry, in particular receiving circuitry for receiving communication signals and/or messages from other network nodes over e.g. cables and using communication protocols.

The features that have been described, as well as features described in the following, may be combined in different ways for providing a method 50 performed in a second network node, examples of which are given in the following with reference to FIG. 6.

Figure 6:
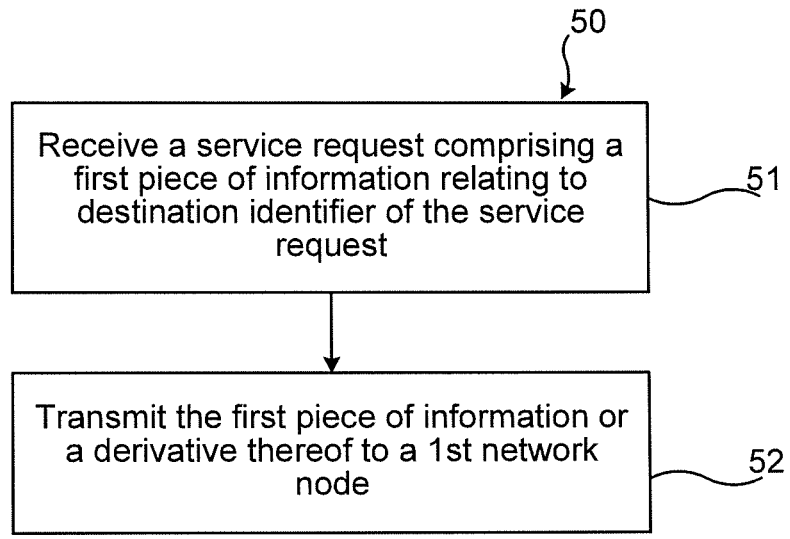
FIG. 6 illustrates a flow chart over steps of a method in a second network node in accordance with the present disclosure.

FIG. 6 illustrates a flow chart over steps of a method in a second network node in accordance with the present disclosure. The method 50 may for instance be implemented in a MME 13 of the second wireless network 11. The method 50 may be implemented in order to enable improvement of the security of voice calls using the Circuit Switched (CS) domain of a first wireless network 21, for instance MO CSFB calls. Such voice call service may e.g. be requested by a communication device 12. It is however noted that the teachings of the present disclosure are applicable also to other scenarios, as described earlier.

The method 50 for securing validity of a service request may be performed in a second network node 13, for instance a MME of an LTE network.

The method 50 comprises receiving 51, from a communication device 12, a service request comprising a first piece of information relating to a destination identifier of the service request.

The method 50 comprises transmitting 52, to a first network node 22, the first piece of information relating to a destination identifier of the service request, or a derivative of the first piece of information, enabling the first network node 22 to establish a correspondence between the first piece of information and a second piece of information.

In an embodiment, the first piece of information comprises a derivative of a phone number of the destination, and wherein the second piece of information comprises a phone number of the destination.

In an embodiment, the method 50 comprises inputting 52 the received first piece of information in a hash function or a one-way function, and wherein the transmitting 52 comprises transmitting the output of the hash function or the one-way function as the derivative of the first piece of information.

In various embodiments, the method 50 comprises providing, to the first network node 22, a set of destination identifiers corresponding to destinations to which services of the service requests are allowed to be set up for the communication device 12. This enables the first network node 22 to allow service requests only to a limited set of destinations.

Figure 7:
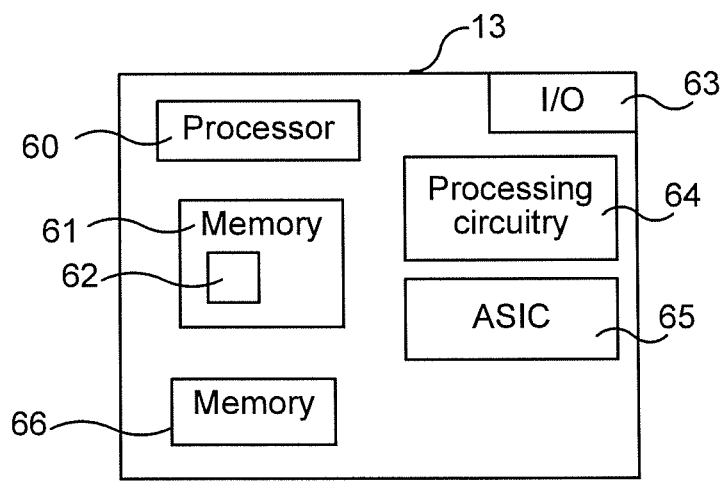
FIG. 7 illustrates schematically a second network node and means for implementing embodiments of methods of the present disclosure.

FIG. 7 illustrates schematically a second network node and means for implementing methods of the present disclosure. The various embodiments of the method 50 as described e.g. in relation to FIG. 6 may be implemented in the second network node 13. As has been described, the second network node 13 may be a node of a purely packet switched network, such as LTE.

The second network node 13 comprises a processor 60 comprising any combination of one or more of a central processing unit (CPU), multiprocessor, microcontroller, digital signal processor (DSP), application specific integrated circuit etc. capable of executing software instructions stored in a memory 61, which can thus be a computer program product 61. The processor 60 can be configured to execute any of the various embodiments of the method 50 for instance as described in relation to FIG. 6.

The memory 61 can be any combination of read and write memory (RAM) and read only memory (ROM), Flash memory, magnetic tape, Compact Disc (CD)-ROM, digital versatile disc (DVD), Blu-ray disc etc. The memory 61 also comprises persistent storage, which, for example, can be any single one or combination of magnetic memory, optical memory, solid state memory or even remotely mounted memory.

A data memory 66 may also be provided for reading and/or storing data during execution of software instructions in the processor 60. The data memory 66 can for instance be any combination of random access memory (RAM) and read only memory (ROM).

The second network node 13 may also comprise an input/output device 63, indicated by I/O in FIG. 7. The input/output device 73 may comprise an interface for communication exchange for instance with other network nodes, such as the first network node 22 or other entities of the first wireless network 21 or the second wireless network 11. The input/output device 63 may for instance comprise a communication protocol enabling communication between different nodes.

A second network node 13 is provided for enabling a first network node to ensure validity of a service request. The second network node 13 may be a node of a LTE network, e.g. a MME node.

The second network node 13 is configured to perform any of the embodiments of the method 50 that has been described with reference to FIG. 6. The second network node 13 may be configured to perform the steps of the described embodiments e.g. by comprising a processor 60 and memory 61, the memory 61 containing instructions executable by the processor 60, whereby the second network node 13 is operative to perform the steps.

The second network node 13 may for instance be configured to:

receive, from a communication device 12, a service request comprising a first piece of information relating to a destination identifier of the service request, and transmit, to a first network node 22, the first piece of information relating to a destination identifier of the service request, or a derivative of the first piece of information, enabling the first network node 22 to establish a correspondence between the first piece of information and a second piece of information.

FIG. 7 also illustrates an example of an implementation of the second network node 13 using function modules/software modules. In particular, FIG. 7 illustrates means in the form of function modules 64, 65 for implementing embodiments of the method of the present disclosure. The means, e.g. function modules, can be implemented using software instructions such as computer program executing in a processor and/or using hardware, such as application specific integrated circuits (ASICs), field programmable gate arrays, discrete logical components etc., and any combination thereof. In FIG. 7, processing circuitry is illustrated at reference numeral 64, and an ASIC at reference numeral 65. The processing circuitry 64 may be adaptable and comprise for instance processing circuitry adapted to perform any of the steps of the methods that have been described. For example, the second network node 13 may comprise processing circuitry adapted to receive, from a communication device, a service request comprising a first piece of information relating to a destination identifier of the service request. Such processing circuitry may for instance comprise receiving circuitry. The second network node 13 may comprise processing circuitry adapted transmit, to a first network node 22, the first piece of information relating to a destination identifier of the service request, or a derivative of the first piece of information, enabling the first network node 22 to establish a correspondence between the first piece of information and a second piece of information. Such processing circuitry may for instance comprise transmitting circuitry.

Figure 8:
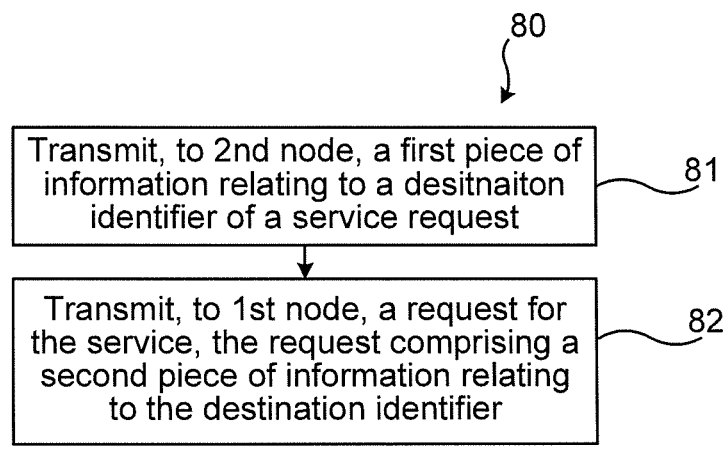
FIG. 8 illustrates a flow chart over steps of a method in a communication device in accordance with the present disclosure.

FIG. 8 illustrates a flow chart over steps of a method in a communication device in accordance with the present disclosure.

A method 80 for ensuring validity of a service request is provided. The method 80 may be performed in a communication device 12. The method 80 comprises:

transmitting 81, to a second network node 13, a first piece of information relating to a destination identifier of the service request, and transmitting 82, to a first network node 22, a request for the service, the request comprising a second piece of information relating to the destination identifier.

The first network node 22 may, based on the first and second pieces of information determine validity of the service request. If the service request is determined to be valid, the first network node 22 may set up the requested service and provide the service to the communication device 12 accordingly, e.g. providing a wireless channel for a circuit switched call.

In an embodiment, the first piece of information and/or the second piece of information comprises an identification of the destination or a derivative thereof.

In an embodiment, the first piece of information comprises a derivative of a phone number of the destination, and wherein the second piece of information comprises a phone number of the destination.

In an embodiment, the method 80 comprises inputting an identification of the destination into a hash function or a one-way function, and wherein the transmitting 81 comprises transmitting the output of the hash function or the one-way function as the second piece of information.

In an embodiment, the method 80 comprises inputting an identification of the destination into a hash function or a one-way function, and wherein the transmitting 82 comprises transmitting the output of the hash function or the one-way function as the first piece of information.

In various embodiments, the identification of the call destination comprises a phone number.

In an embodiment, the method 80 comprises transmitting to the second network node 13 a set of call destination identifications corresponding to call destinations to which service requests are allowed to be set up for the communication device 12.

Figure 9:
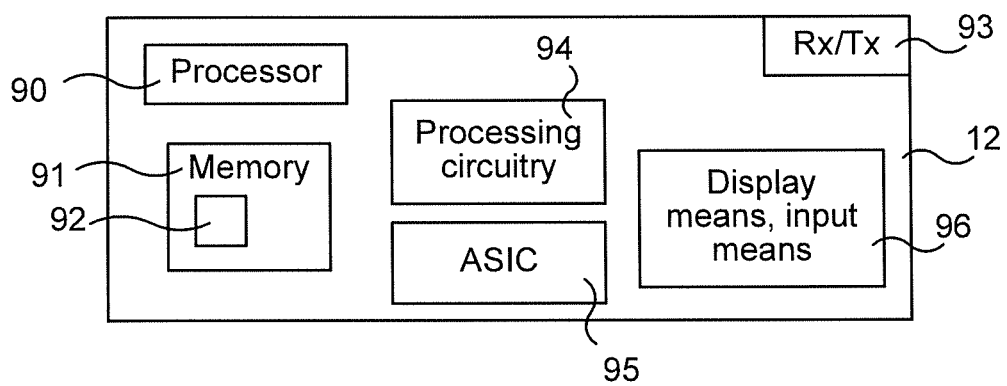
FIG. 9 illustrates schematically a communication device and means for implementing embodiments of methods of the present disclosure.

FIG. 9 illustrates schematically a communication device and means for implementing methods of the present disclosure. The various embodiments of the method 80 as described e.g. in relation to FIG. 8 may be implemented in the communication device 12.

The communication device 12 comprises a processor 90 comprising any combination of one or more of a central processing unit (CPU), multiprocessor, microcontroller, digital signal processor (DSP), application specific integrated circuit etc. capable of executing software instructions stored in a memory 91, which can thus be a computer program product 91. The processor 90 can be configured to execute any of the various embodiments of the method 80 for instance as described in relation to FIG. 8.

The memory 91 can be any combination of read and write memory (RAM) and read only memory (ROM), Flash memory, magnetic tape, Compact Disc (CD)-ROM, digital versatile disc (DVD), Blu-ray disc etc. The memory 91 also comprises persistent storage, which, for example, can be any single one or combination of magnetic memory, optical memory, solid state memory or even remotely mounted memory.

The communication device 12 may also comprise an input/output device 93, indicated by Rx/Tx in FIG. 9. The input/output device 93 may comprise an interface for communication exchange for instance with network nodes, such as radio access node 14 of a purely packet switched network 11 or a radio access node 23 of a 2G/3G network 21. The input/output device 93 may for instance comprise antenna device and transmitting and receiving circuitry for wireless communication over a radio interface. If the communication device 12 is a server, the input 7 output device 93 may instead comprise a communication protocol enabling communication between different nodes, e.g. wired communication over a cable.

The communication device 12 may further comprise various other means and devices. For instance, if the communication device 12 comprises a wireless device it may comprise display means and input means, schematically indicated at reference numeral 96.

The communication device 12 is configured to perform any of the embodiments of the method 80 that has been described with reference to FIG. 8. The communication device 12 may be configured to perform the steps of the described embodiments e.g. by comprising a processor 90 and memory 91, the memory 91 containing instructions executable by the processor 90, whereby the communication device 12 is operative to perform the steps.

The communication device 12 may for instance be configured to:

transmit, to a second network node 13, a first piece of information relating to a destination identifier of the service request, and transmit, to a first network node 22, a request for the service, the request comprising a second piece of information relating to the destination identifier.

FIG. 9 also illustrates an example of an implementation of the communication device 12, 13 using function modules/software modules. In particular, FIG. 9 illustrates means in the form of function modules 94, 95 for implementing embodiments of the method of the present disclosure. The means, e.g. function modules, can be implemented using software instructions such as computer program executing in a processor and/or using hardware, such as application specific integrated circuits (ASICs), field programmable gate arrays, discrete logical components etc., and any combination thereof. In FIG. 9, processing circuitry is illustrated at reference numeral 94, and an ASIC at reference numeral 95. The processing circuitry 94 may be adaptable and comprise for instance processing circuitry adapted to perform any of the steps of the methods that have been described. For example, the communication device 12 may comprise processing circuitry adapted to transmit, to a second network node 13, a first piece of information relating to a destination identifier of the service request. Such processing circuitry may for instance comprise transmitting circuitry and antennas or cables. The communication device 12 may comprise processing circuitry adapted to transmit, to a first network node 22, a request for the service, the request comprising a second piece of information relating to the destination identifier. Such processing circuitry may for instance comprise transmitting circuitry and antennas or cables.

Thus, in the example embodiments described hereinafter, the present disclosure provides methods in network nodes, for instance a first network node of a 2G or 3G network and a second network node of a purely packet switched network such as LTE. In some embodiments, wherein a service that is requested comprises a circuit switched call, the first network node (e.g. a MSC) may be a node of a 2G or 3G network providing a CSFB function for a communication device having a subscription in the packet switched network. The second network node may then be a MME of the packet switched network.

Embodiment 1

A method for ensuring validity of a service request, the method being performed in a first network node, the method comprising:

receiving, from a second network node, a first piece of information relating to a destination identifier of the service request, receiving, from a communication device, a request for the service, the request comprising a second piece of information relating to the destination identifier, determining the service request to be valid if establishing a correspondence of the first piece of information with the second piece of information, else determining the service request to be invalid.

Embodiment 1 may for instance be performed in a MSC 22 of a 2G or 3G network.

Embodiment 1a

Method of embodiment 1, comprising setting up the service of the service request when determining the service request to be valid and rejecting the service request when determining the service request to be invalid.

Embodiment 1b

Method of Embodiment 1 or 1a, wherein the first piece of information comprises a first phone number of the destination, and wherein the second piece of information comprises a second phone number of the call destination, and wherein the determining comprises determining the service request to be valid if the first piece of information is equal to the second piece of information.

Embodiment 1c

Method of Embodiment 1 or 1a, wherein the first piece of information comprises a derivative of a phone number of the destination, and wherein the second piece of information comprises a phone number of the destination, and wherein the determining comprises deriving the second piece of information and determining the service request to be valid if the derivative of the second piece of information is equal to the first piece of information.

Embodiment 1d

Method of Embodiment 1 or 1a, wherein the first piece of information comprises a phone number of the destination, and wherein the second piece of information comprises a derivative of a phone number of the destination, and wherein the determining comprises deriving the first piece of information and determining the service request to be valid if the derivative of the first piece of information is equal to the second piece of information.

Embodiment 1e

Method of any of the previous embodiments, wherein the determining is to be made within a set period of time.

Embodiment 1f

Method of embodiment 1e, wherein the service request is rejected if the duration during which the determining is made is longer than the set period of time.

Embodiment 1g

Method of any of the previous embodiments, comprising obtaining a set of destination identifiers corresponding to destinations to which services of the service requests are allowed to be set up for the communication device and wherein the determining comprises determining the service request to be valid if the second piece of information comprises a destination identifier in the obtained set of destination identifiers.

Embodiment 1h

Method of any of the previous embodiments, wherein the service comprises a circuit switched call.

Embodiment 1i

Method of embodiment 1h, wherein the circuit switched call comprises a circuit switched fallback call provided by a first wireless network, and the second network node comprises a network node of a second wireless network.

Embodiment 2

A first network node for ensuring validity of a service request, the first network node being configured to perform any of the embodiments of Embodiments 1, 1a, 1b, 1c, 1d, 1e, 1f, 1g, 1h, 1i.

Embodiment 3

A method for securing validity of a service request, the method being performed in a second network node, the method comprising:

receiving, from a communication device, a service request comprising a first piece of information relating to a destination identifier of the service request, and transmitting, to a first network node, the first piece of information relating to a destination identifier of the service request, or a derivative of the first piece of information, enabling the first network node to establish a correspondence between the first piece of information and a second piece of information.

Embodiment 3 may for instance be performed in a MME 13 of a purely packet switched network, such as LTE.

Embodiment 3a

Method of Embodiment 3, wherein the first piece of information comprises a derivative of a phone number of the destination, and wherein the second piece of information comprises a phone number of the destination.

Embodiment 3b

Method of Embodiment 3, comprising inputting the received first piece of information in a hash function or a one-way function, and wherein the transmitting comprises transmitting the output of the hash function or the one-way function as the derivative of the first piece of information.

Embodiment 3c

Method of embodiments 3, 3a, 3b, comprising providing, to the first network node, a set of destination identifiers corresponding to destinations to which services of the service requests are allowed to be set up for the communication device.

Embodiment 4

A second network node for securing validity of a service request, the second network node being configured to perform any of the embodiments of Embodiments 3, 3a, 3b, 3c.

Embodiment 5

A method for ensuring validity of a service request, the method being performed in a communication device, the method comprising:
- transmitting, to a second network node, a first piece of information relating to a destination identifier of the service request, and
- transmitting, to a first network node, a request for the service, the request comprising a second piece of information relating to the destination identifier.

Embodiment 5a

The method of Embodiment 5, wherein the first piece of information and/or the second piece of information comprises an identification of the destination or a derivative thereof.

Embodiment 5b

The method of Embodiment 5, wherein the first piece of information comprises a derivative of a phone number of the destination, and wherein the second piece of information comprises a phone number of the destination.

Embodiment 5c

The method of Embodiment 5 or 5a or 5b, comprising inputting an identification of the destination into a hash function or a one-way function, and wherein the transmitting comprises transmitting the output of the hash function or the one-way function as the second piece of information.

Embodiment 5d

The method of Embodiment 5, 5a, 5b or 5c comprising inputting an identification of the destination into a hash function or a one-way function, and wherein the transmitting (82) comprises transmitting the output of the hash function or the one-way function as the first piece of information.

Embodiment 5e

The method of Embodiment 5, wherein the identification of the destination comprises a phone number.

Embodiment 5f

The method of Embodiment 5, 5a, 5c, 5d or 5e, comprising transmitting to the second network node a set of call destination identifications corresponding to call destinations to which service requests are allowed to be set up for the communication device.

Embodiment 6

A communication device for securing validity of a service request, the communication device being configured to perform any of the embodiments of Embodiments 5, 5a, 5b, 5c, 5d, 5e, 5f.

The invention has mainly been described herein with reference to a few embodiments. However, as is appreciated by a person skilled in the art, other embodiments than the particular ones disclosed herein are equally possible within the scope of the invention.

The invention claimed is:

1. A method for a first network node of ensuring validity of a service request, the method comprising:
   - receiving, from a second network node, a first piece of information relating to a destination identifier of the service request, wherein the first piece of information comprises a first derivative of a first phone number of the destination;
   - receiving, from a communication device, a request for the service, the request comprising a second piece of information relating to the destination identifier;
   - determining whether a correspondence exists between the first piece of information and the second piece of information;
   - determining the service request to be valid as a result of determining that a correspondence exists between the first piece of information and the second piece of information.

2. The method as claimed in claim 1, comprising setting up the service of the service request as a result of determining the service request to be valid.

3. The method as claimed in claim 1, wherein the second piece of information comprises a second phone number of the destination,
   - determining whether there is a correspondence between the first piece of information and the second piece of information comprises deriving a second derivative of the second phone number of the destination determining that the second derivative of the second phone number of the destination is equal to the first derivative of the first phone number of the destination.

4. The method as claimed in claim 1, wherein the second piece of information comprises a second derivative of a second phone number of the destination, and
   - determining whether there is a correspondence between the first piece of information and the second piece of information comprises determining that the first derivative of the first phone number of the destination is equal to the second derivative of the second phone number of the destination.

5. The method as claimed in claim 1, wherein determining whether a correspondence exists between the first piece of information and the second piece of information is to be made within a set period of time.

6. The method as claimed in claim 5, wherein the service request is rejected if a duration during which the determining is made is longer than the set period of time.

7. The method as claimed in claim 1, further comprising obtaining a set of destination identifiers corresponding to destinations to which services of the service requests are allowed to be set up for the communication device;
   - determining whether the second piece of information comprises a destination identifier in the obtained set of destination identifiers; and
   - determining the service request to be valid as a result of determining that the second piece of information comprises a destination identifier in the obtained set of destination identifiers.

8. The method as claimed in claim 1, wherein the service comprises a circuit switched call.

9. The method as claimed in claim 8, wherein the circuit switched call comprises a circuit switched fallback call provided by a first wireless network, and the second network node comprises a network node of a second wireless network.

10. A computer program product for a first network node for ensuring validity of a service request, the computer program product comprising a non-transitory computer readable medium storing computer program code, which, when executed on at least one processor on the first network node causes the first network node to perform the method according to claim 1.

11. A first network node for ensuring validity of a service request, the first network node being configured to perform the method as claimed in claim 1.

12. A first network node for ensuring validity of a service request, the first network node comprising a processor and a memory, the memory containing instructions executable by the processor whereby the first network node is operative to:
   receive, from a second network node, a first piece of information relating to a destination identifier of the service request, wherein the first piece of information comprises a first derivative of a first phone number of the destination;
   receive, from a communication device, a request for the service, the request comprising a second piece of information relating to the destination identifier;
   determine whether a correspondence exists between the first piece of information and the second piece of information;
   determine the service request to be valid as a result of determining that a correspondence exists between the first piece of information and the second piece of information.

13. A method for a second network node of securing validity of a service request, the method comprising:
   receiving, from a communication device, a service request comprising a first piece of information relating to a destination identifier of the service request, wherein the first piece of information comprises a first derivative of a first phone number of the destination; and
   transmitting, to a first network node, the first piece of information relating to a destination identifier of the service request, enabling the first network node to determine whether a correspondence exists between the first piece of information and a second piece of information.

14. The method as claimed in claim 13, wherein the second piece of information comprises a second phone number of the destination.

15. The method as claimed in claim 13, further comprising inputting the received first piece of information in a hash function or a one-way function, and wherein the transmitting comprises transmitting a derivative of the first piece of information, wherein the derivative of the first piece of information is the output of the hash function or the one-way function.

16. The method as claimed in claim 13, further comprising providing, to the first network node, a set of destination identifiers corresponding to destinations to which services of the service requests are allowed to be set up for the communication device.

17. A computer program product for a second network node for ensuring validity of a service request, the computer program product comprising a non-transitory computer readable medium storing computer program code, which, when executed on at least one processor on the second network node causes the second network node to perform the method according to claim 13.

18. A second network node for securing validity of a service request, the second network node being configured to perform the method as claimed in claim 13.

19. A second network node for securing validity of a service request, the second network node comprising a processor and a memory, the memory containing instructions executable by the processor whereby the second network node is operative to:
   receive, from a communication device, a service request comprising a first piece of information relating to a destination identifier of the service request, wherein the first piece of information comprises a first derivative of a first phone number of the destination; and
   transmit, to a first network node, the first piece of information relating to a destination identifier of the service request, enabling the first network node to determine whether a correspondence exists between the first piece of information and a second piece of information.

20. A method for a communication device of ensuring validity of a service request, the method comprising:
   transmitting, to a second network node, a first piece of information relating to a destination identifier of the service request, wherein the first piece of information comprises a first derivative of a first phone number of the destination; and
   transmitting, to a first network node, a request for the service, the request comprising a second piece of information relating to the destination identifier.

21. The method as claimed in claim 20, wherein one or more of the first piece of information and the second piece of information comprises an identification of the destination or a derivative thereof.

22. The method as claimed in claim 20, wherein the second piece of information comprises a second phone number of the destination.

23. The method as claimed in claim 20, further comprising inputting an identification of the destination into a hash function or a one-way function, and wherein the transmitting comprises transmitting the output of the hash function or the one-way function as the second piece of information.

24. The method as claimed in claim 20, further comprising inputting an identification of the destination into a hash function or a one-way function, and wherein the transmitting comprises transmitting the output of the hash function or the one-way function as the first piece of information.

25. The method as claimed in claim 20, wherein the identification of the destination comprises a phone number.

26. The method as claimed in claim 20, further comprising transmitting to the second network node a set of call destination identifications corresponding to call destinations to which service requests are allowed to be set up for the communication device.

27. A computer program product for a communication device for ensuring validity of a service request, the computer program product comprising a non-transitory computer readable medium storing computer program code, which, when executed on at least one processor of the communication device causes the communication device to perform the method according to claim 20.

28. A communication device for securing validity of a service request, the communication device being configured to perform the method as claimed in claim 20.

29. A communication device for ensuring validity of a service request, the communication device comprising a processor and a memory, the memory containing instructions executable by the processor whereby the second network node is operative to:
- transmit, to a second network node, a first piece of information relating to a destination identifier of the service request, wherein the first piece of information comprises a first derivative of a first phone number of the destination; and
- transmit, to a first network node, a request for the service, the request comprising a second piece of information relating to the destination identifier.

30. The method as claimed in claim 1, wherein the first network node is a Mobile Service Center and the second network node is a Mobile Management Entity.

31. The method as claimed in claim 1, wherein the first derivative of the first phone number of the destination is a hash or a key derivation function of the first phone number of the destination.

* * * * *